Figure 6:
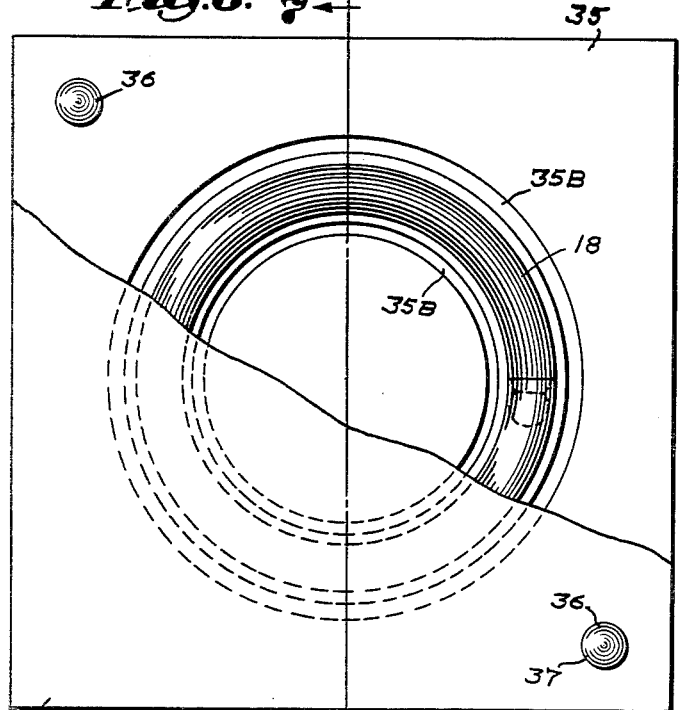

April 12, 1966  D. G. WAY  3,246,065
METHOD OF MAKING SEALING RINGS
Filed May 27, 1964　　　　　　　　　　　　　　　2 Sheets-Sheet 1
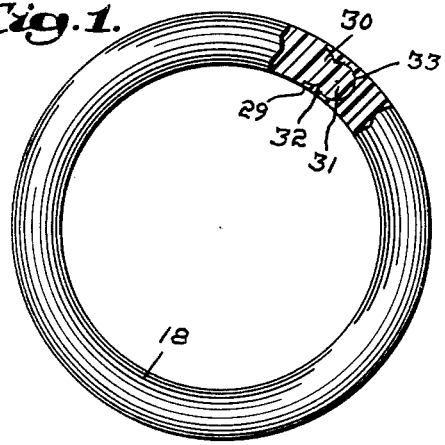
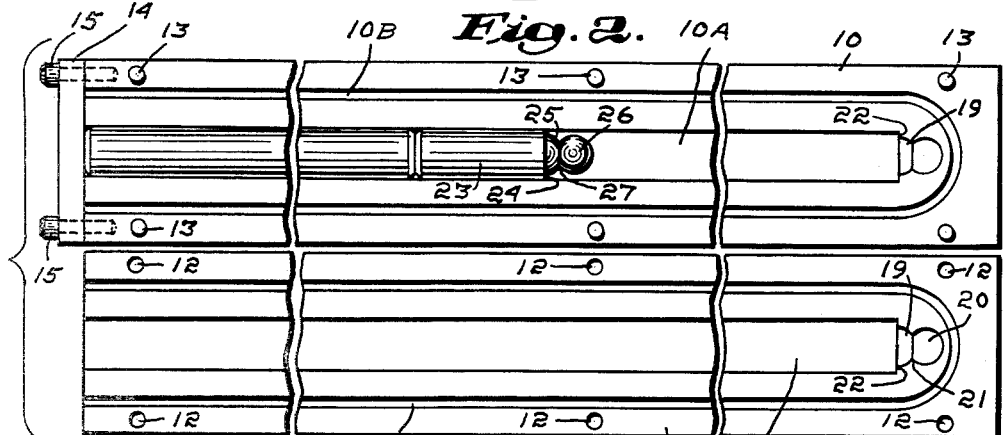
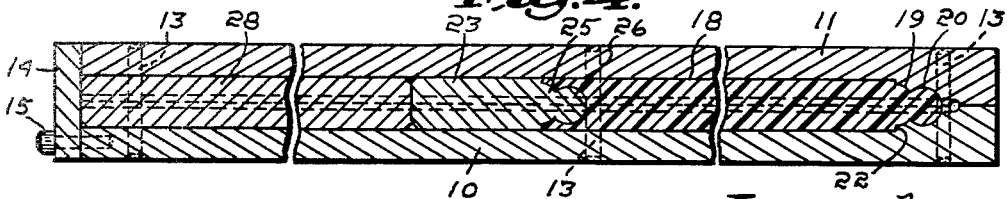
Inventor:
David G. Way,
by Albt Spm.
Attorney April 12, 1966   D. G. WAY   3,246,065

METHOD OF MAKING SEALING RINGS

Filed May 27, 1964   2 Sheets-Sheet 2

Inventor:
David G. Way,
by [signature]
Attorney

United States Patent Office 3,246,065
Patented Apr. 12, 1966

3,246,065
METHOD OF MAKING SEALING RINGS
David G. Way, Boxborough, Mass.
(R.F.D., West Acton, Mass.)
Filed May 27, 1964, Ser. No. 370,658
4 Claims. (Cl. 264—130)

The present invention relates to the production of sealing rings that may be closed about a member and this application is a continuation-in-part of my co-pending application Serial No. 177,346, filed May 5, 1962, and now abandoned.

Sealing rings are widely used in many places where their replacement is difficult. By way of illustration, sealing rings are commonly used between the end walls of a pump and its gland and in the shaft seal backed by that gland. Should leakage develop that is due to failure of a sealing ring, that particular ring can usually be exposed without too much trouble. It cannot be replaced, however, with presently available sealing rings, until the end of the pump shaft has been freed to enable parts to be removed so that the replacement sealing ring can be slipped over the shaft and into place. There is, accordingly, a real need for a sealing ring that can be closed about a member.

Such sealing rings, while commonly of stock that is of circular cross section and known as "O-rings" are also available in other cross sectional shapes such, for example, as X, square, and triangular shapes. The present invention is concerned with any such sealing rings of resilient and deformable rubber or plastic stock that may be closed about a member but is herein discussed with particular reference to O-ring embodiments. It will be understood, however, that the term "sealing rings" is intended to include O-rings and other rings of the same general type whatever their cross sectional shape.

The principal objective of the invention is to provide a seal in the form of an open or openable sealing ring that may be closed about a member. In accordance with the invention, this objective is attained by providing an elongated, sealing ring establishing body of resiliently yieldable stock with one end of the body having a socket to receive a mating projection on the other end therefore to provide a releasable joint to convert the body into a sealing ring. The projection includes a forwardly and inwardly tapering portion, a head, and an intermediate neck with the dimensions of the tapering portion closely approximating the dimensions of the body in the area adjacent thereto. The socket is complementally sized and shaped for mating engagement with the projection thus to yieldably receive and hold the head of the projection and to provide a skirt to overlie and resiliently engage the tapering portion with its free edge engaging the junction of the tapering portion and the body.

Another objective is to provide sealing ring establishing members wherein the axial extent of the socket is greater than that of the projection thereby to provide excess stock in the free end of the socket, a construction of particular value when the sealing ring establishing body has a normal straight form although also of use when the body has been molded to have a normal circular form.

While such a sealing ring may be made, in one operation, as an elongated body of normally straight form and having a socket at one end and a mating projection at the other which, when entered into that socket, provides a sealing ring, it is preferred to make the seal by first pre-forming an elongated body to provide it with its socket and projection, next, to form a ring with the projection entrant of the socket while preventing their permanent union, and then, to cure the ring while in a circular form, thus to provide an openable O-ring.

In the accompanying drawings, there are shown illustrative embodiments of the invention from which these and other of its objectives, and also its novel features and advantages, will be readily apparent.

Figure 7:
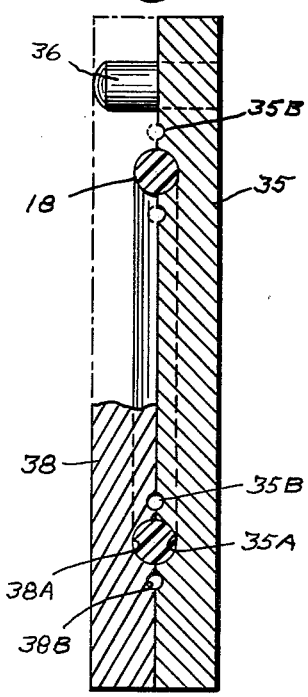
Figure 8:
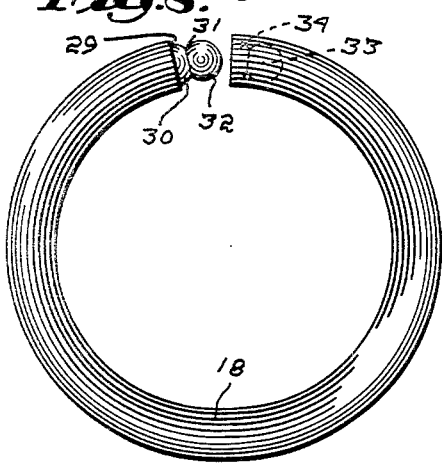
Figure 10:
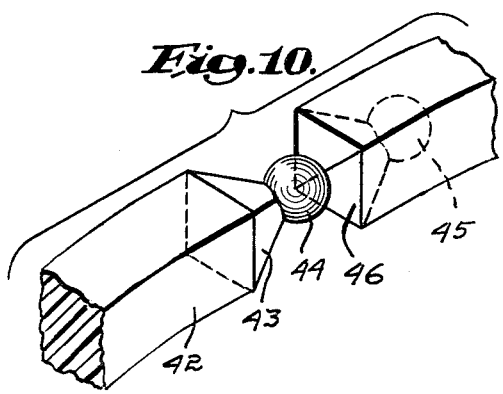
Figure 9:
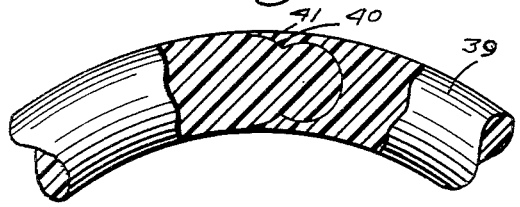

In the drawings:

FIGURE 1 is a partly sectional elevation of an O-ring in accordance with the invention, FIGURE 2 is a plan view showing the mutually engageable faces of a mold and inserts positioned in the lower mold half, FIGURE 3 is a top plan view of the mold in a closed position, FIGURE 4 is a section taken approximately along the indicated lines 4—4 of FIGURE 3, and showing a seal body therein, FIGURE 5 is an elevation of the seal body removed from the mold, FIGURE 6 is a top plan view of a mold for use in finishing an O-ring from the body shown in FIGURE 5, when the body is a pre-form, part of the mold cover being broken away, FIGURE 7 is a section taken approximately along the indicated lines 7—7 of FIGURE 6, FIGURE 8 is a side elevation of the finished O-ring, shown as opened, FIGURE 9 is a partly sectioned, side view of an O-ring, illustrating a modification of the invention, and FIGURE 10 is a partly sectioned view of a sealing ring illustrating yet another embodiment of the invention.

In FIGURES 2-4, there is shown a mold consisting of a bottom half 10 and an upper half 11 having holes 12 slidably receiving pins 13 carried by the bottom half. The mold halves 10 and 11 each have a channel opening through one end thereof and surrounded by an overflow channel. These, in the case of the bottom half, are indicated at 10A and 10B, respectively, and, in the case of the upper half, at 11A and 11B, respectively. When the mold is assembled, the channels 10A and 11A define the mold cavity. The open ends of the channels of the bottom half are closed by the end wall 14, attached to the bottom half as at 15, and dimensioned to overlie and close the ends of the channels of the upper half when the mold is assembled.

At their closed ends, the cavity-establishing channels 10A and 11A are shaped to form a projection on a seal body 18 and these are shown as comprising forwardly and inwardly tapering portions 19, head portions 20, and intermediate neck portions 21. The maximum width of the portions 19 are at least equal to that of the head portions 20 but less than the width of the channels 10A, 11A thus to establish shoulders 22.

Seated in the cavity is an insert 23 having, at its leading end, a projection for forming a cavity in the other end of the seal body 18. As that cavity is complemental in size and shape to the projection of the body, the insert 23 is shown as having a shoulder 24, a forwardly and inwardly tapering portion 25, a head 26, and an intermediate neck 27. In order that the mold may be used in molding seal bodies of different length, spacers, such as the spacer 28, are provided to vary the distance between the projection-forming end of the mold cavity and the cavity forming end of the insert 23. It should be noted that the length of the portion 25 is slightly greater than the length of the portions 19 of the mold halves.

In practice, a blank of moldable material, rubber for example, is placed in the mold, the mold is then closed and subjected to heat and pressure. After the predetermined curing cycle is completed, the mold is opened, the body 18 and the insert 23 are removed therefrom, and the insert 23 is detached from the body 18. If the curing cycle was such as to fully cure the body 18, its projection may be entered into its socket to define a finished O-ring after the flashing has been trimmed. It is preferred, however, that the body 18 be subjected to a curing cycle that will ensure only the full formation of its projection and socket and that further curing be performed in a second mold.

In either case, the projection has a shoulder 29, a forwardly and inwardly tapering portion 30, a head 31, and an intermediate neck 32. The socket is indicated at 33 and as it is complemental in size and shape to the projection, its description will not be detailed other than to point out that its free end is in the form of a skirt 34 which is somewhat longer than the tapering portion 30 of the projection.

In the preferred method, the preformed body 18 is removed from the mold, and its projection is entered into its cavity. The projection may be prevented from becoming sealed in its cavity by coating it with a mold release agent or by providing the projection or the cavity with a layer of film or foil.

The preformed body 18 is then ready to be fully cured, while in circular form, in the mold shown in FIGURES 6 and 7 whose bottom half 35 has pins 36 slidable in holes 37 in the upper mold half 38. The mold half 35 has a circular channel 35A surrounded by inner and outer overflow channels 35B. The upper mold half 38, similarly has a circular channel 38A and inner and outer overflow channels 38B. The channels 35A and 38A define the cavity in which the preformed body 18 is cured by the application of appropriate heat and pressure to the closed mold for a sufficient time interval. The body 18 is now a finished O-ring that may be opened and closed and, when closed, there is no appreciable departure from a general toric shape in any area, including the jointed area.

In FIGURE 9, an O-ring 39 is shown that is identical to the O-ring 18 except that the forwardly and inwardly tapering portion 40 of its projection does not establish a shoulder at its junction with the main portion of its body and that the free extremity of its cavity is in the form of a skirt 41 tapering to as close to a feather edge as is practicable in molding.

In FIGURE 10 a sealing ring 42 is shown that has the identical features of the O-rings 39 and 18 except that its body and its forwardly and tapering portion 43 are of rectangular cross sectional shape; its head 64, however, is shown as spherical as is the socket 45 in its other end, the skirt 46 being shown as rectangular and somewhat longer than the tapering portion 43.

It will be apparent that, with any sealing ring in accordance with the invention, the cooperating tapering skirt and projection portion ensure a tight joint when that seal is installed as any potential leakage path is of a depth less than the deformation of that ring in service.

I claim:

1. In the production of a sealing ring, the steps that consist in first preforming with heat and pressure an elongated, normally straight, elastic, solid body with an axial projection on one end characterized by a forwardly and inwardly tapering portion whose dimensions closely approximate the dimensions of the body in the area adjacent thereto, a head, and an intermediate neck, and with a mating socket in the other end thereof sized and shaped to provide a portion to receive and hold the head and a skirt to overlie and resiliently engage the forwardly and inwardly tapering portion, providing one of the mating surfaces with an anti-adhesive coat inserting the projection into the socket, continuing said preforming to partially cure said projection and socket to an extent rendering them capable of being mated without permanent deformation, and then subjecting the entire joined body to heat and pressure while confining it as a ring to cure the body and simultaneously to reshape the socket and projection to be arcuate with respect to each other and to the ring and to merge the free end of the skirt with the body at the junction of the tapering portion therewith.

2. The method of claim 1 and the step of adding extra stock to the skirt-establishing portion of the socket.

3. The method of claim 1 and the step of preforming the skirt-establishing portion of the socket longer than the forwardly and inwardly tapering portion of the projection.

4. The method of claim 1 in which the step of preforming the body includes the provision of a shoulder at the junction of the forwardly and inwardly tapering portion with the body and the establishment of a skirt length greater than the length of the forwardly and inwardly tapering portion.

References Cited by the Examiner

UNITED STATES PATENTS

| | | | |
|---|---|---|---|
| 1,323,706 | 12/1919 | Macbeth | 264—326 |
| 2,390,070 | 12/1945 | Auzin | 264—264 |

ROBERT F. WHITE, *Primary Examiner.*

F. MARLOWE, L. S. SQUIRES, *Assistant Examiners.*